United States Patent [19]

Kubat et al.

[11] 4,237,089

[45] Dec. 2, 1980

[54] METHOD OF REDUCING INTERNAL STRESSES AND IMPROVING THE MECHANICAL PROPERTIES OF INJECTION MOLDED THERMOPLASTIC RESINS

[75] Inventors: Josef Kubat; Jan K. Djurner, both of Gothenburg, Sweden

[73] Assignee: Sunds AB, Helsingborg, Sweden

[21] Appl. No.: 926,212

[22] Filed: Jul. 19, 1978

Related U.S. Application Data

[63] Continuation of Ser. No. 748,916, Dec. 9, 1976, abandoned.

[51] Int. Cl.³ .................................... B29F 1/00
[52] U.S. Cl. .................................... 264/328.1
[58] Field of Search .......................... 264/328

[56] References Cited

U.S. PATENT DOCUMENTS

| 2,033,735 | 3/1936 | Pack | 425/578 X |
| 3,243,851 | 4/1966 | Reitter, Jr. et al. | 264/328 X |

OTHER PUBLICATIONS

Menges et al., Injection Machine Design in the 1980's, *Plastics & Polymers*, Jun. 1972.
Glanvill, A. B., Plastics Engineer's Data Book, 1974, Industrial Press, New York, N.Y., p. 34 to 40 relied on.
Rubin, Irvin, Injection Molding Theory and Practice, 1972, Wiley Interscience Publication, p. 269 to 279 relied on.
Bradshaw et al., Saran for Injection Molding, Modern Plastics, Oct. 1942, p. 6 of reprint in 264/328 relied on.
G. Menges, W. Dalhoff, and P. Mohren, "Heat-Sensitive Materials Turn on the Pressure", *SPE Journal*, 4-1972, vol. 28, pp. 72-76.
Joel Frados, *Plastics Engineering Handbook*, 1976, Fourth Edition, pp. 93-94.
E. C. Bernhardt, Dr. Ing., *Processing of Thermoplastic Materials*, 1965, 5th printing, pp. 348-349.

*Primary Examiner*—Jan H. Silbaugh
*Attorney, Agent, or Firm*—Haseltine, Lake & Waters

[57] ABSTRACT

A method of reducing internal stresses in and improving the mechanical properties of injection molded articles made of thermoplastic resins is disclosed wherein under in other respects normal injection molding conditions thermoplastic resins are injection molded at high injection and holding pressures within the range 250-800 MPa.

8 Claims, 17 Drawing Figures

• High molecular weight HDPE
○ HDPE

METHOD OF REDUCING INTERNAL STRESSES AND IMPROVING THE MECHANICAL PROPERTIES OF INJECTION MOLDED THERMOPLASTIC RESINS

This is a continuation, of application Ser. No. 748,916 filed Dec. 9, 1976, now abandoned.

The present invention relates to a method of reducing and controlling internal stresses and improving mechanical properties of injection molded articles of thermoplastics, which method is characterized by injection molding the thermoplastics under in other respects normal injection molding conditions with the use of high injection and holding pressures, suitably exceeding 250 MPa, preferably exceeding 300 MPa, a suitable range being for instance 300–500 MPa and up to 800 MPa. MPa=$10^6$ Pa; 1 Pa=1 N/m$^2$, 1 N=1 kg. m/s$^2$ where M=mega, Pa=pascal, N=newton, m=meter, kg=kilogram and s=second according to the International System of Units)

The magnitude and distribution of internal stresses in injection molded plastic products is the result of a complicated interplay of a large number of factors, among which, as has been discovered according to the present invention, the injection pressure and the holding pressure, i.e. the pressure which prevails in the mold cavity during the solidification of the plastic melt, have been shown to play an important role.

The influence of the injection pressures, by which herein is meant the injection and holding pressure, which do not need to be equal but preferably both should reach values above 250 MPa, on internal stresses in injection molded products has not been clearly elucidated. On the whole, the variation of the pressure within the range normally used in injection molding appears to affect the properties of the moldings to a minor extent only.

In order to measure the influence of the injection pressure the volume proportion of oriented material as dependent on the pressure has been determined; cf. Kantz, M R Intern. J. Polymeric Mat. 1974, 3, 245. Further, the degree of orientation has been determined and the results have been presented in terms of a so-called orientation stress; cf. Jensen, M and Whisson, R R, Polymer, 1973, 14, 193. Measured in the flow direction this quantity decreased only to a minor extent as the pressure was raised. The materials studied were polystyrene, polypropylene, polysulfone and acrylonitrile-butadiene-styrene-plastic (ABS). Similar results have been reported also when using a hardness method for measuring the combined action of internal stresses and anisotropy; cf. Fett, T, Plastverarbeiter 1973, 24, 665. The injection pressures used in these investigations were, however, only moderate, generally lower than 200 MPa.

When the polymer melt solidifies in the mold, internal stresses are frozen-in as a result of differences in the solidification rate between the surface parts and the interior of the object. Normally, this results in compressive stresses at the surface and tensile stresses in the interior. Such effects are well-known and have been analyzed both experimentally; cf. Fett, T, loc. cit; Menges, G and Wübken, G "Kunststofftechnisches Kolloquium", 1972, 21; Alpsten, G "Residual Stresses in Hot-Rolled Steel Shapes"; Diss, R, Inst. of Technology, Stockholm 1967; Knappe, W, Kunststoffe 1961, 51, 562; and theoretically; cf. Knappe, W, loc. cit.

The present invention relates to a method of reducing and controlling the internal stress level ($\sigma_i$) and improving the mechanical strength properties of injection molded articles of thermoplastic resins by using high injection and holding pressures, preferably exceeding 250–300 MPa.

Normally, in injection molding of thermoplastic resins injection pressures of from about 50 MPa up to about 150–200 MPa are used, the last-mentioned range only being used very seldom.

According to the present invention it has surprisingly been found that by increasing the injection pressure it is possible to bring about a reduction in the overall internal stress level of injection molded products of thermoplastic resins. Further, it has been found that molded products having highly improved mechanical strength properties can be obtained by injection molding at high injection and holding pressures above 250 MPa. The increase of the injection pressure which is necessary for achieving said reduction of the overall internal stress level of injection molded thermoplastic articles is somewhat dependent on the thermoplastic resin used. As a general rule it can be said that to achieve an essential reduction of the internal stress level of injection molded thermoplastic objects according to the present invention an injection pressure exceeding 250–300 MPa must be used. By means of the method according to the present invention it is possible to produce injection molded thermoplastic parts which are characterized by an essentially reduced tendency to mold shrinkage, warping, crazing and cracking, post-shrinkage and time dependent deformation and other negative effects which are usual in articles injection molded with normal injection pressures. These advantages, which are obtained by the method according to the invention, are very important in the production of for instance articles with close tolerances. Another essential advantage obtained by means of the method according to the invention is that considerably shorter cycle times are required for the injection molding, the reason being a substantial increase in thermal diffusivity of thermoplastic materials with pressure.

A further essential advantage which is obtained by the method according to the invention is that the mechanical properties, such as breaking stress and modulus of elasticity of the injection molded articles can be highly improved.

The method according to the present invention is useful for producing injection molded products of different thermoplastic resins which normally are used for preparing injection molded products. Examples of such thermoplastic resins are olefin plastics, such as polyethylene, of both low and high density type (LD- and HD-type, respectively), polyethylene having extra high molecular weight, i.e. having a molecular weight above 200,000 and up to 1.5 million and higher, including so-called ultra-high molecular weight polyethylene, polypropylene, polyethylene copolymers; styrene plastics, such as polystyrene, styrene-copolymers, for instance styrene-acrylonitrile plastic (SAN) and acrylonitrile-butadiene-styrene plastic (ABS); acrylic plastics, such as polymethylmethacrylate (PMMA); amide plastics; acetal plastics; carbonate plastics; polyesters of thermoplastic type, such as polyethylene or polybutylene terephthalate (PETP or PBTP); cellulose plastics; vinyl plastics, such as vinylchloride plastics, for instance polyvinyl chloride (PVC), copolymers of vinylchloride, etc., and other thermoplastic resins having so high molecular weight that normally they can not be injection molded.

DESCRIPTION OF THE DRAWINGS

Finally.

As stated above, the use of high injection pressures for reducing the internal stress level of injection molded thermoplastic articles also results in improvements of other properties of the injection molded objects, for instance an increase of the yield stress or/and breaking stress and a reduction of the mold shrinkage.

The invention is illustrated by means of the following specific examples which describe embodiments of the invention but which are not intended to limit the invention in any respect.

EXAMPLES 1–2

Experiments were carried out with samples of polyethylene of both low density type (LD-type) and high density type (HD-type). The following materials were used: LDPE (BASF, Lupolen 1800 M), density 0.916–0.918 g/cm$^3$, melt index 6–8 g/10 minutes (MFI 190/2 16); HDPE (Hoechst, Hostalen GC 72600), density 0.960 g/cm$^3$, melt index 7 g/10 minutes (MFI 190/2 16).

The injection molding of the samples at varying injection pressures was performed using a modified injection molding machine of conventional type (Engel 500/250 AS). This machine was equipped with a special screw. The main feature of this screw was a plunger (diameter 30 mm) at its end, the molten polymer flowing through a central bore in the plunger. Backflow of the melt during injection into the mold was prevented by a non-return valve. In this way injection pressures varying between 100 MPa and 500 MPa could be attained. The holding pressure was identical with the injection pressure.

The conditions in the injection molding process are shown in the following table I.

The method used for determining the internal stress values, the $\sigma_i$-values, was a stress relaxation method which has been previously described, cf. Kubat, J and Rigdahl, M, Intern. J. Polymeric Mat. 1974, 3, which article is incorporated by reference herein.

The stress-strain and relaxation experiments were carried out at 22±0.5° C.

Figure 1:
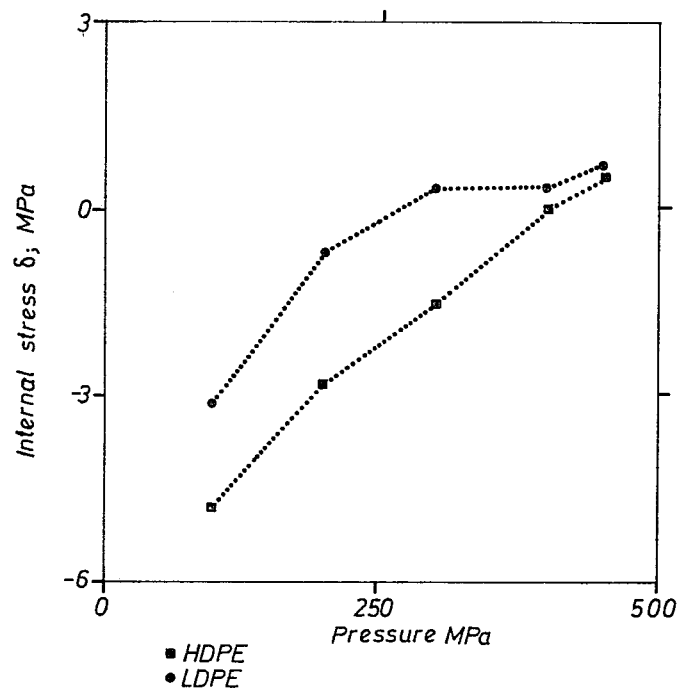
FIG. 1 shows the internal stress as plotted against the injection pressure for two different types of polyethylene, viz. high density polyethylene (HDPE) and low density polyethylene (LDPE).

The relationship between the internal stress parameter $\sigma_i$ and the injection pressure is shown in FIG. 1 for the two types of polyethylene, HDPE and LDPE, respectively. The $\sigma_i$-value changes from comparatively large negative values to rather small positive ones. It is to be noted that one can cause the shrinkage to disappear completely at a certain pressure. It can also be seen that for HDPE the $\sigma_i$-value at 100 MPa is larger (negative) than that for LDPE. From said figure it can be clearly seen that by a suitable choice of the injection pressure the $\sigma_i$-value can be reduced to zero.

The extent of shrinkage was determined by measuring the distance between two marks along the flow direction in the mold and the corresponding distance between the replicas of these marks left on the molded samples. The shrinkage value $\epsilon_s$ was calculated from:

$$-\epsilon_s = \frac{a_s - a_m}{a_m}$$

where $a_m$ and $a_s$ denote the distance between the points in the mold and on the sample, respectively.

Figure 2:
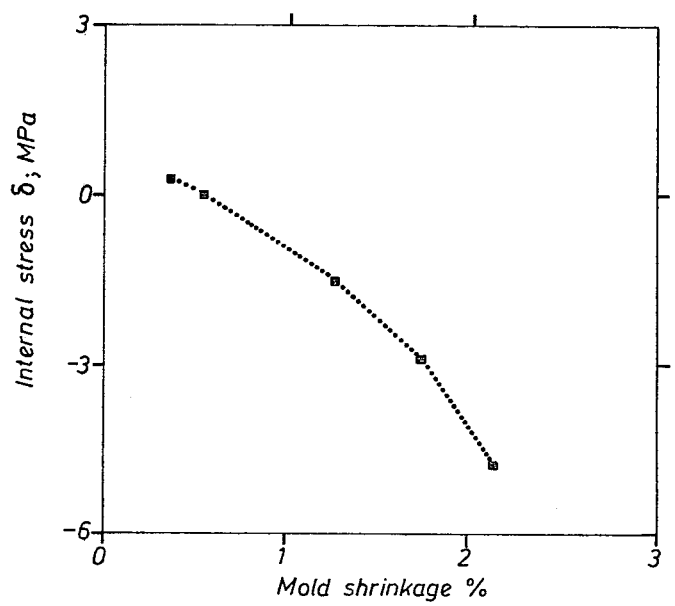
FIG. 2 shows the internal stress plotted against the mold shrinkage.

FIG. 2 shows the relationship between internal stress and the mold shrinkage. It follows from this figure that the lower the absolute value of $\sigma_i$, the lower is also the shrinkage.

When discussing the results obtained, one should keep in mind the complexity of the various factors influencing the residual stress distribution in an injection molded specimen. In the first place such stresses are not homogeneous. Normally, their distribution forms a pattern, the characteristics of which depend on processing and material parameters. For specimens of the type used here one usually finds relatively high compressive internal stresses in the surface layers and weak tensile stresses in the interior.

The $\sigma_i$-values stated above are thus to be considered as average values of the various layers of the sample. As the average $\sigma_i$-level is evaluated from certain parameters of stress relaxation curves, it is to be assumed that also these parameters in their turn are averages. Thus, the course of the stress relaxation is the result of a superposition of relaxation processes in the different layers of the specimen having different $\sigma_i$-values.

An analysis of the relaxation curves and the overall $\sigma_i$-values obtained from them shows the general influence of the injection pressure on the properties of the molded sample. The first result to be noted is that the residual compressive stress obtained in normal injection molding practice is reduced by increasing the pressure. At the highest pressures used this compressive stress is reversed into a weak tensile one. Thus, it appears possible to reduce the average $\sigma_i$-value to zero by an appropriate rise in the injection pressure; cf. FIG. 1.

The mechanism behind the appearance of an internal stress distribution in an injection molded specimen has been previously discussed; cf. Knappe, W, Kunststoffe 1961, 51, 562. In the present context it may suffice to say that these stresses are due to a temperature gradient during cooling. The outer layers solidify in the initial stage of the cooling process. Owing to differences in specific volume between melt and solid compressive stresses are frozen into the solidified surface layers when the interior of the specimen becomes solid. For balance reasons weak tensile stresses prevail in the interior.

The method according to the present invention of reducing internal stresses in injection molded articles by increasing the injection and holding pressures to a high level can probably be theoretically explained in the following manner, but the invention shall not be restricted in any way by said theory. It is known that the melting point of a polymer is relatively sensitive to pressure, an increase of about 20° C. per 100 MPa having been found for polyethylene; cf. Matsouka, S, J. Pol. Sci. 1962, 57, 581 and Osugi, J and Hara, K, The Review of Physical Chemistry of Japan 1966, 36, 28. Increasing the pressure on the melt in the mold is thus equivalent to an overall increase of the melting point of the polymer. In principle, when the mold has been filled and the peak pressure is reached the whole cavity content can be caused to solidify simultaneously. In normal molding the solidification (crystallization) takes place when the temperature in different parts of the mold passes a critical value ($T_m$). The important thing to note is that this critical temperature is reached at different times in different parts of the specimen. Contrary to this, when using high pressures the crystallization can take place simultaneously in the whole of the specimen. It is thus possible to ascribe to the injection pressure the role of a crystallization regulator, a role not taken advantage of hitherto in the production of stress-free moldings.

From a closer look at FIG. 1 it can be seen that the injection pressure corresponding to O-level of $\sigma_i$ is approximately the pressure by which the melting points of HDPE and LDPE are raised to a temperature equal to that of the melt leaving the cylinder; cf. Matsouka, S J, loc. cit. and Osugi, J and Hara, K, loc. cit.

Another effect which probably contributes to the reduction of the $\sigma_i$-level on increasing the pressure is a decrease in the thermal shrinkage occurring in the vicinity of $T_m$; cf. Matsouka, S J, loc. cit. and an increase in thermal diffusivity reducing temperature gradients in the solidifying part.

The influence of the injection and holding pressure on the $\sigma_i$-level has been illustrated above, using LDPE and HDPE as examples. For other crystalline polymers the melting temperature is shifted in a similar way, e.g. for polypropylene $T_m$ increases from about 175° C. at atmospheric pressure to about 245° C. at a pressure of 220 MPa; cf. Baer, E and Kardos, J L, J. Pol. Sci. 1965, A-3, 2827, and for polyamide 6 and polyoxymethylene a change in melting temperature of 38° C. and 44° C. per 100 MPa, respectively, in the pressure range 0–200 MPa has been reported; cf. Katayama, Y and Yoneda, K, Review of the Electrical Communication Laboratories 1972, 20, 921 and Starkweather, H K, J. Phys. Chem. 1960, 64, 410. The role played by the increase in the melting temperature with pressure is, on the other hand, not restricted to crystalline polymers. It is known that the corresponding critical temperature for amorphous polymers, i.e. the glass transition temperature, also rises when the pressure is increased, e.g. for polystyrene, PVC and PMMA a shift of $T_g$ of 32° C., 16° C. and 29° C. per 100 MPa, respectively, has been determined; cf. Billinghurst, P R and Tabor, D Polymer 1971, 12, 101. As this increase per 100 MPa is of the same order of magnitude as that in $T_m$ for crystalline polymers the effect of increasing injection pressure for reducing the overall internal stress level appears to be a generally useful method of reducing and controlling internal stresses in injection molded articles of thermoplastic resins of both crystalline and amorphous type.

TABLE I

| | MOLDING CONDITIONS | | | | |
|---|---|---|---|---|---|
| Material | Melt temp. (°C.) | Mold temp. (°C.) | Injection time (s) | Holding time (s) | Cooling time (s) |
| HDPE | 200–240 | 30 | 1 | 15 | 35 |
| LDPE | 180–200 | 30 | 1 | 14 | 30 |

EXAMPLES 3–4

In this experiment high molecular weight HDPE (DMDS-2215 supplied by Unifos Kemi AB) with a density of 0.953 g/cm³, melt index ($MI_{21}$) 7 g/10 minutes was used. The polyethylene was injection molded with a modified injection molding machine of the same type as used in the previous examples (Engel 250/500 AS).

The following molding conditions were used:
Melt temperature: 250–280° C.
Mold temperature: 30° C.
Injection time: 6 seconds
Holding time: 15 seconds
Cooling time: 5 seconds
Samples were injection molded at pressures varying from 100 to 490 MPa.

The injection molded specimens were small tensile test bars with a gauge length of 25 mm and a thickness of 1.5 mm. During the cycle the hydraulic pressure and the pressure within the mold were recorded. The mold pressure was measured with a pressure transducer (Colortronic 407) via a dummy ejection pin.

Thin slices (30 μm) of the specimens, cut with a microtome, were measured in a differential scanning calorimeter (Perkin Elmer, DSC 2). The slices were cut at different distances from the surface of the samples. The accuracy of the DSC-measurements was ±2° C.

The mechanical properties of the tensile test samples were determined using a conventional tensile tester (Instron model 1193). The strain rate was 20 mm/minute ($1.3 \cdot 10^{-2} s^{-1}$). The tangent modulus (E), tensile strength at break ($\sigma_B$) and elongation at rupture ($\epsilon_B$) were determined according ASTM D638.

Figure 3:
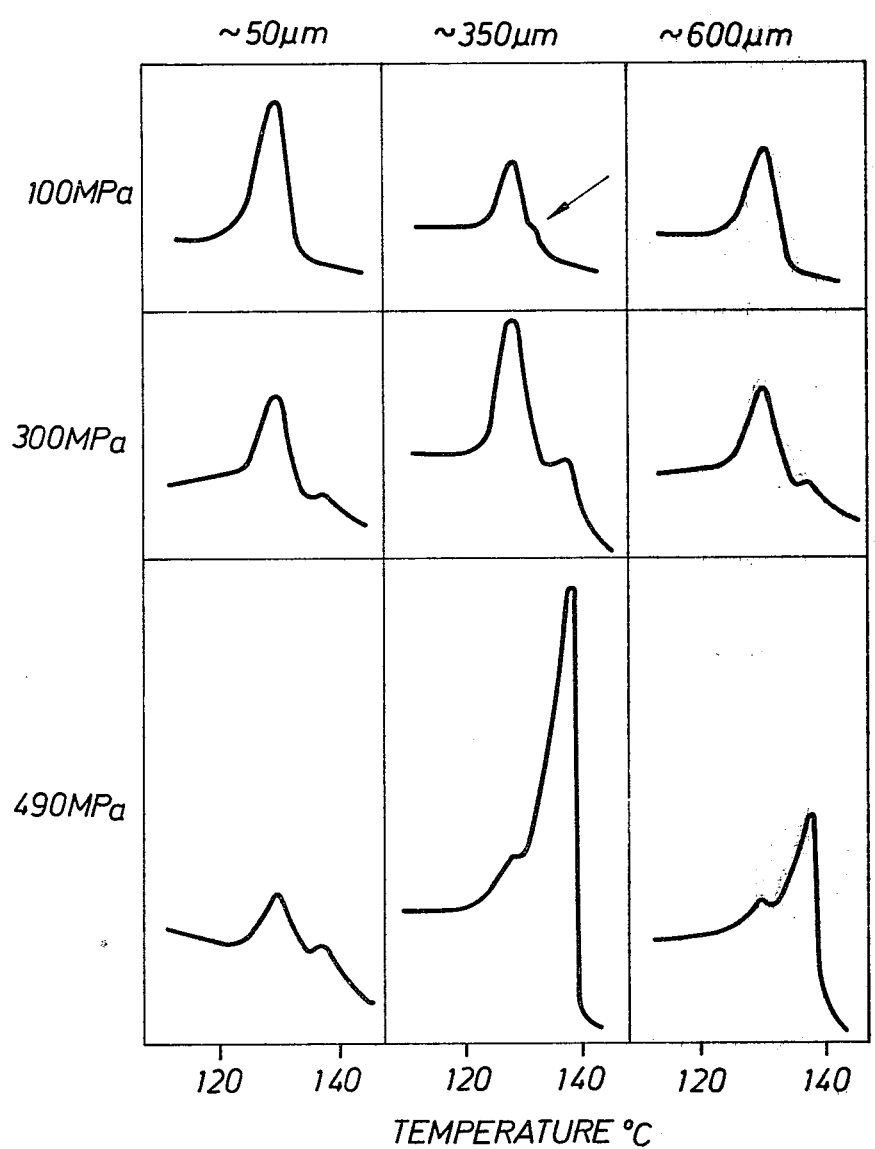
FIG. 3 shows different curves obtained from differential scanning calorimeter measurements on slices cut at different distances from the surface of samples of injection molded high density polyethylene having extra high molecular weight.

The results of the DSC-measurements are summarized in FIG. 3. The curves shown relate to a maximum cavity pressure of 100, 300 and 490 MPa, respectively, for samples taken at varying distance from the surface of the molding. As can be seen from the figure, the curves for the 100 MPa samples have a normal appearance, indicating a $T_m$-value at 128° C. Only the sample taken 350 μm from the surface exhibited a small shoulder at $T > T_m$ (indicated by an arrow in FIG. 3).

An increase of the maximum p-value in the mold to 300 MPa results in a new clearly-developed melting peak for all the samples investigated, and particularly for the sample taken 350 μm under the surface. At 490 MPa, a further increase in the intensity of this new peak can be seen. Again the 350 μm-sample peak is markedly higher when compared with samples cut at 50 and 600 μm from the surface, respectively. At the 350 μm-depth, the bulk of the melting now seems concentrated to the 137° C.-level, but even at 600 μm the higher melting peak is more intense than at 50 μm.

Figure 4:
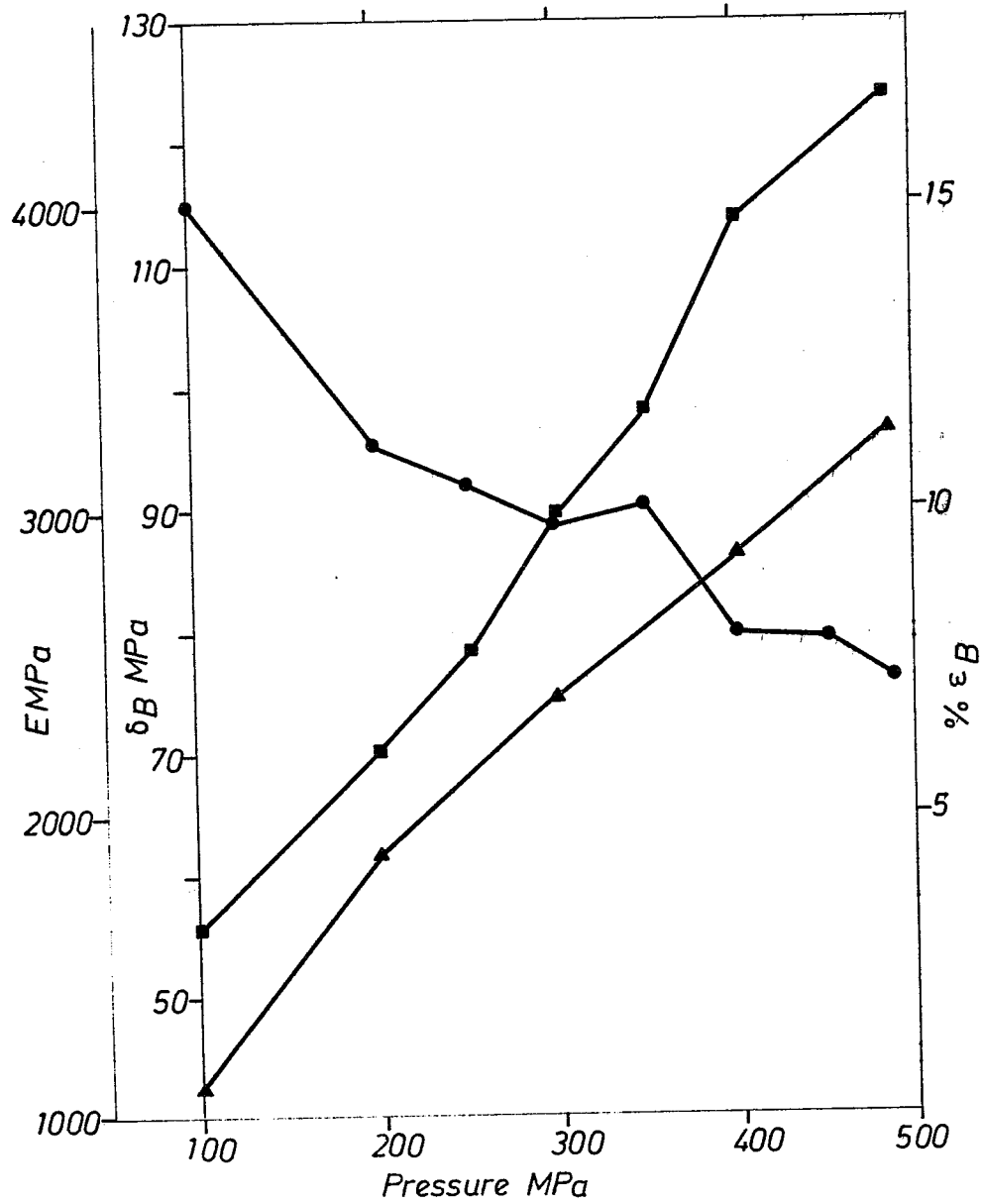
FIG. 4 shows the modulus of elasticity and the breaking stress and the elongation at rupture plotted against the maximum cavity pressure.
Figure 5:
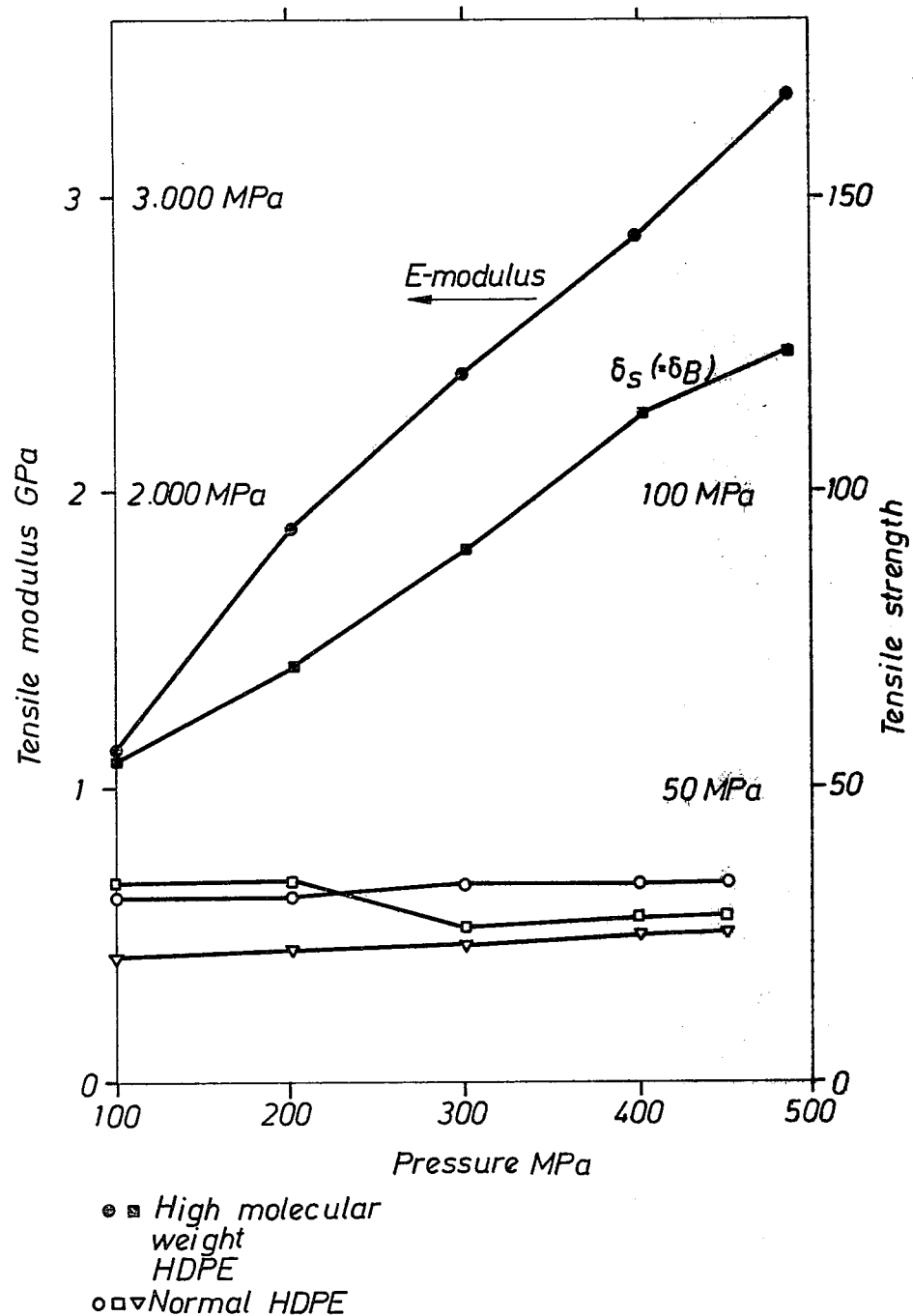
FIG. 5 shows the tensile properties of high molecular weight HDPE and normal HDPE plotted against the injection pressure.

The occurrence of a high pressure phase, melting at 137° C., was associated with rather marked changes in the mechanical properties of the moldings. FIG. 4 shows the modulus of elasticity and the breaking stress $\sigma_B$ and elongation $\epsilon_B$ as a function of the maximum cavity pressure. Both the modulus and $\sigma_B$ increase markedly with this pressure. At 490 MPa the value of $\sigma_B$ reaches the notably high level of about 120 MPa. Parallel with this increase, $\epsilon_B$ falls from 15% at 100 MPa to 5% at the highest pressure. The samples showed no tendency to cold-drawing, independent of the pressure.

The internal stress level of the samples, measured using a stress relaxation technique, decreased sharply with increasing pressure.

The results obtained show that increasing the molding pressure above 300 MPa is associated with the appearance of a new PE-phase showing a DSC-melting peak at 137° C. This phase appears to be concentrated to the well-known second layer of injection molded parts. During the filling of the mold, relatively high shearing forces occur. This effect is due to an increase in melt viscosity with pressure. The reason behind this is partly a reduction of the free volume, partly a substantial increase in the melting point (about 20° C. per 100 MPa). It can be supposed that the shearing forces are especially intense close to the first solidified layer at the cavity walls. This could in turn be related to the excessive occurrence of the new oriented phase in the second layer. In this connection, the formation of extended chains during capillary extrusion of HDPE may also be mentioned. Even though there is limited direct evidence for this, it seems plausible to suppose that this second melting peak is associated with the occurrence of extended chain-like structures in the moldings—among other things the $T_m$-value agrees with literature data.

The small shoulder in the DSC-curve exhibited by the sample molded at 100 MPa, taken from 350 μm depth, could be due to formation of less perfect extended chain-like crystals, having a lower melting point than the more perfect ones.

Substantial changes in the properties of injection molded HDPE-parts may thus be obtained by increasing the cavity pressure above 300 MPa. From the DSC-measurements it can be seen that the barely discernible shoulder in the DSC-curves occurring above the normal melting point can be converted into a distinct maximum which, at the highest pressures used, markedly exceeds the height of the normal $T_m$-peak. Further, it can be seen that the increase in the amount of the high melting phase is accompanied by marked changes in the mechanical parameters of the moldings. It appears plausible to assume that the phase with the higher $T_m$-value, i.e. 137° C., is associated with the occurrence of extended chains or similar structures.

Figure 6:
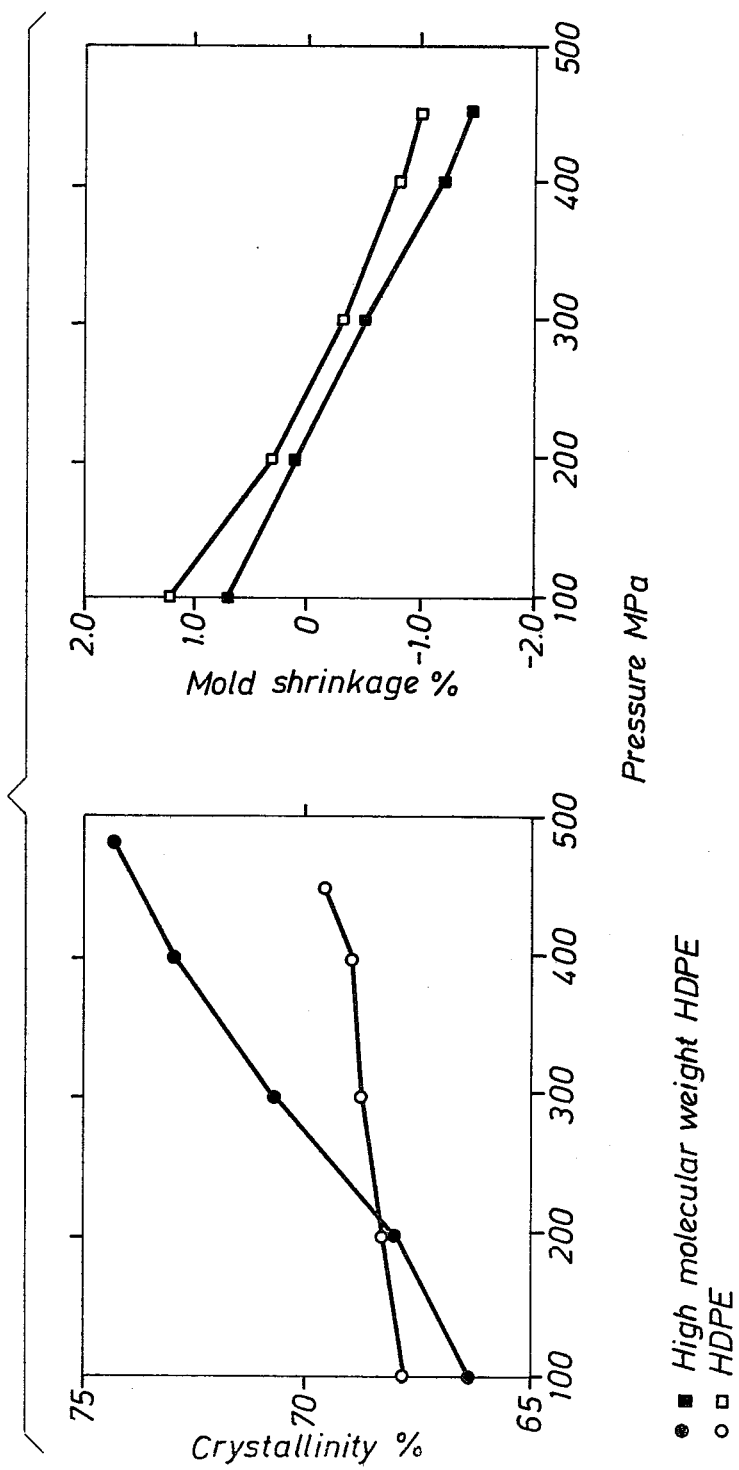
In FIG. 6, the left part shows the crystallinity plotted against the injection pressure for high molecular weight HDPE and normal HDPE, while the right part of said figure shows the mold shrinkage plotted against the injection pressure for the same materials.
Figure 7:
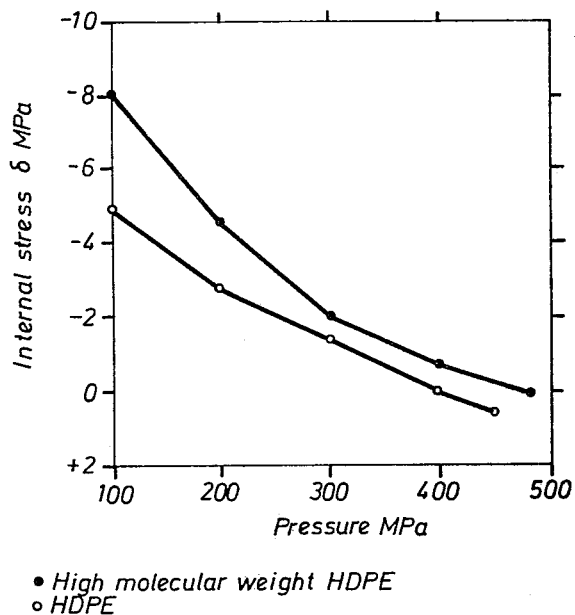
FIG. 7 shows the internal stress plotted against the injection pressure for high molecular weight HDPE and normal HDPE, respectively.
Figure 8:
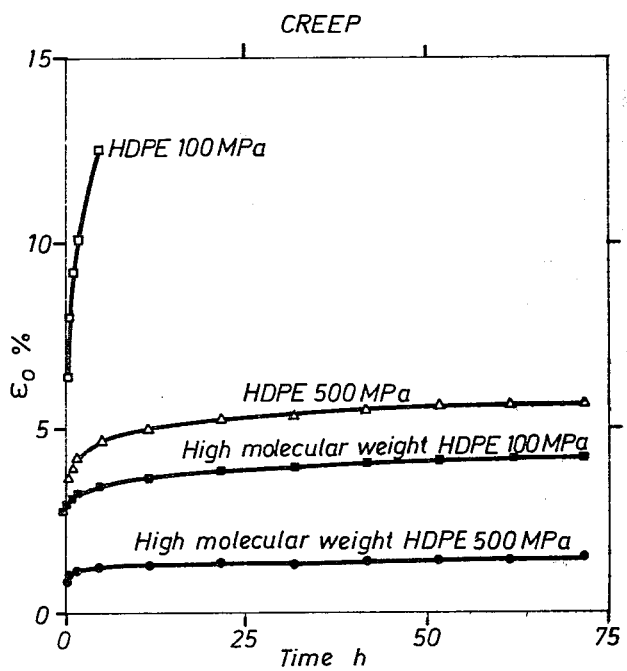
FIG. 8 shows the creep plotted against time for injection molded samples of high molecular weight HDPE and normal HDPE injection molded at 100 and 500 MPa.

Comparative experiments were also carried out using high molecular weight HDPE (superstrength) and normal HDPE which were injection molded at pressures within the range 100–500 MPa and a cylinder temperature of 250°–280° C. The yield properties obtained, which were measured, are shown in FIGS. 5, 6, 7 and 8, where the black points and squares represent high molecular weight HDPE, while the unfilled rings and squares represent normal HDPE. From FIG. 5 it can be seen that substantial improvements of the yield properties, such as tensile modulus and tensile strength, are obtained for high molecular weight HDPE, when using high injection and holding pressures up to 500 MPa. FIG. 6 shows how the crystallinity and the mold shrinkage increase and decrease, respectively, when higher pressures are used. FIG. 7 shows how the internal stress is reduced when using higher injection and holding pressures form 100 to 500 MPa. Finally, in FIG. 8 such a yield property as creep is plotted against time for molding samples injection molded at 100 and 500 MPa, respectively, for normal HDPE and high molecular HDPE, respectively.

EXAMPLES 5–6

In these examples the variations of the properties of the polyacetal (POM) and polyethyleneterephthalate (PETP) within the pressure range 100–500 MPa were investigated. The same injection molding machine was used in the present examples as in the previous examples.

The mechanical properties were determined in the same manner as in the previous examples with a tensile tester (Instron model 1193) and with a strain rate of 20 mm/minute ($1.3 \cdot 10^{-2} s^{-1}$). From the stress-strain curves the yield and breaking stress values ($\sigma_S \sigma_B$), the corresponding elongation values ($\epsilon_S \epsilon_B$) and the modulus of elasticity were determined.

The materials used were:

PETP (unmodified): Arnite A04900 from Akzo Plastics, relative viscosity 1.8–2.0

POM: Hostaform C 9021 from Hoechst AG, density 1.40 g/cm$^3$, melt index (MFI 190/2) 9 g/10 minutes.

The molding conditions for preparing the different samples are summarized in the following table II.

TABLE II

| Sample | Material | Cylinder temp. (°C.) | Injection pressure (MPa) 100 200 300 400 500 Holding pressure (MPa) | Injection time/ Holding time/ Cooling time (secs) | Mold temp. (°C.) |
| --- | --- | --- | --- | --- | --- |
| Tensile bars and samples for density measurement | POM | 180–220 | 95 175 250 350 400 | 10/10/10 | 30 |
|  | PETP | 250–270 | 95 150 150 150 200 | 5/15/10 | 30, 130 |
| Sample for measuring mold shrinkage | POM | 180–220 | 95 195 295 350 400 | 5/20/20 | 30 |
|  | PETP | 250–270 | 95 150 150 150 200 | 20/15/15 | 30 |
|  | PETP | 250–270 | 95 150 200 200 200 | 20/15/15 | 130 |

RESULTS

In principle, the injection and holding pressures during the injection course can be calculated from the oil pressure of the hydraulic system in the injection molding machine. It is true that a prerequisite for this is that the melt remains liquid during the injection and that any pressure losses can be neglected. In the present experiments, the pressure conditions in the mold correspond to the oil pressure of the hydraulic system only for POM. For PETP, the maximum internal mold pressure only was about 300 MPa at a hydraulic pressure of 500 MPa.

Figure 9:
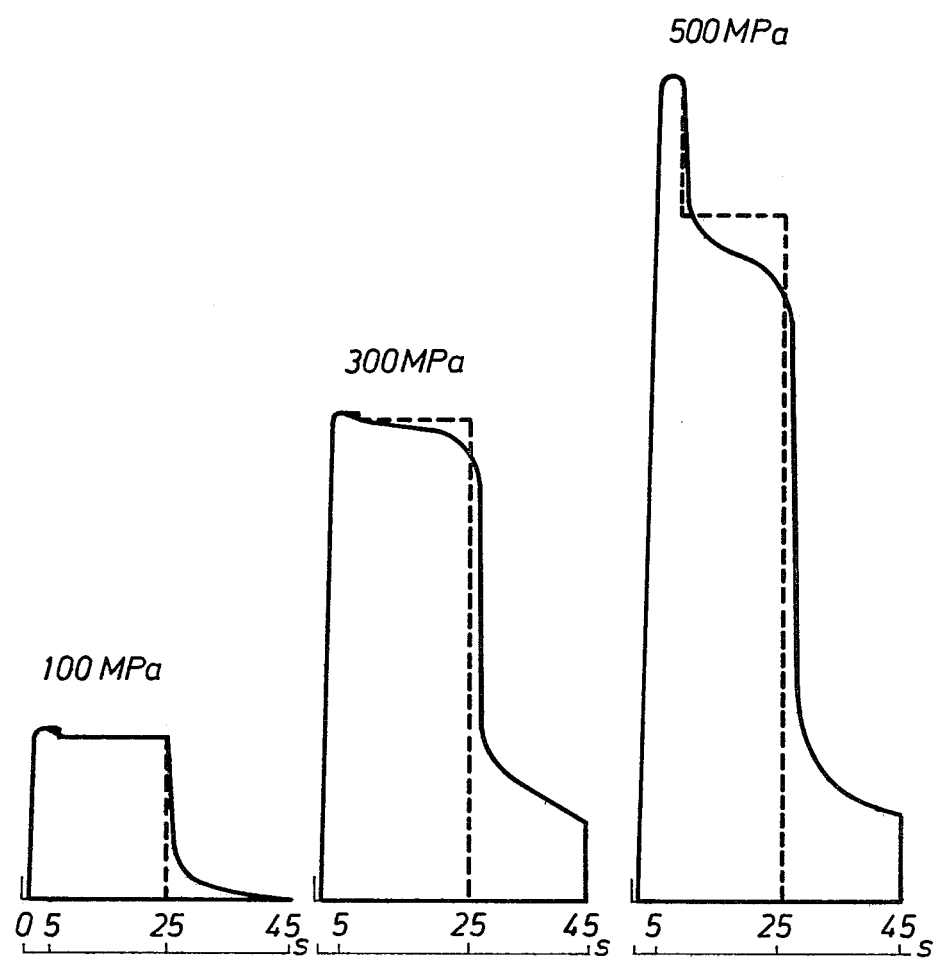
FIG. 9 shows the pressure course in the mold as compared to the hydraulic pressure during the injection and holding periods for polyacetal.
Figure 10:
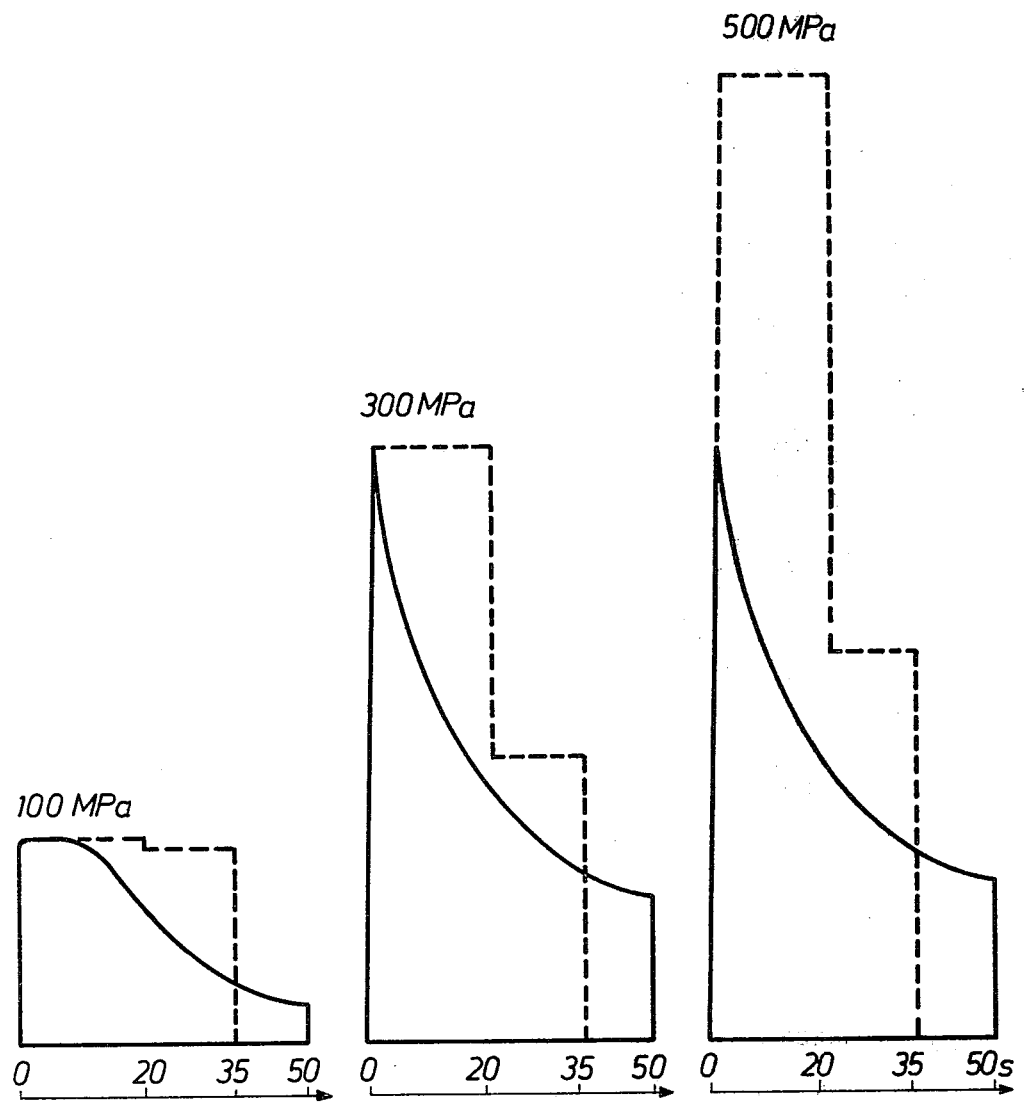
FIG. 10 shows the pressure course in the mold as compared to the hydraulic pressure during the injection and holding periods for polyethyleneterephthalate.

In FIG. 9 the pressure course in the mold as compared to the hydraulic pressure during the injection and holding periods is shown for POM. The conformity is comparatively good, especially as to the injection pressure. The corresponding curves for PETP are shown in FIG. 10. Already at 100 MPa the internal mold pressure (continuous line) decreases more rapidly than the hydraulic pressure (dashed line). Then the maximum pressure attainable in the mold for PETP can not exceed a value of about 300 MPa. Furthermore, the passing to holding pressure can not be seen in the curve for PETP.

PROPERTIES OF THE SAMPLES

The variation of the properties with the injection pressure used will now be described.

Figure 11:
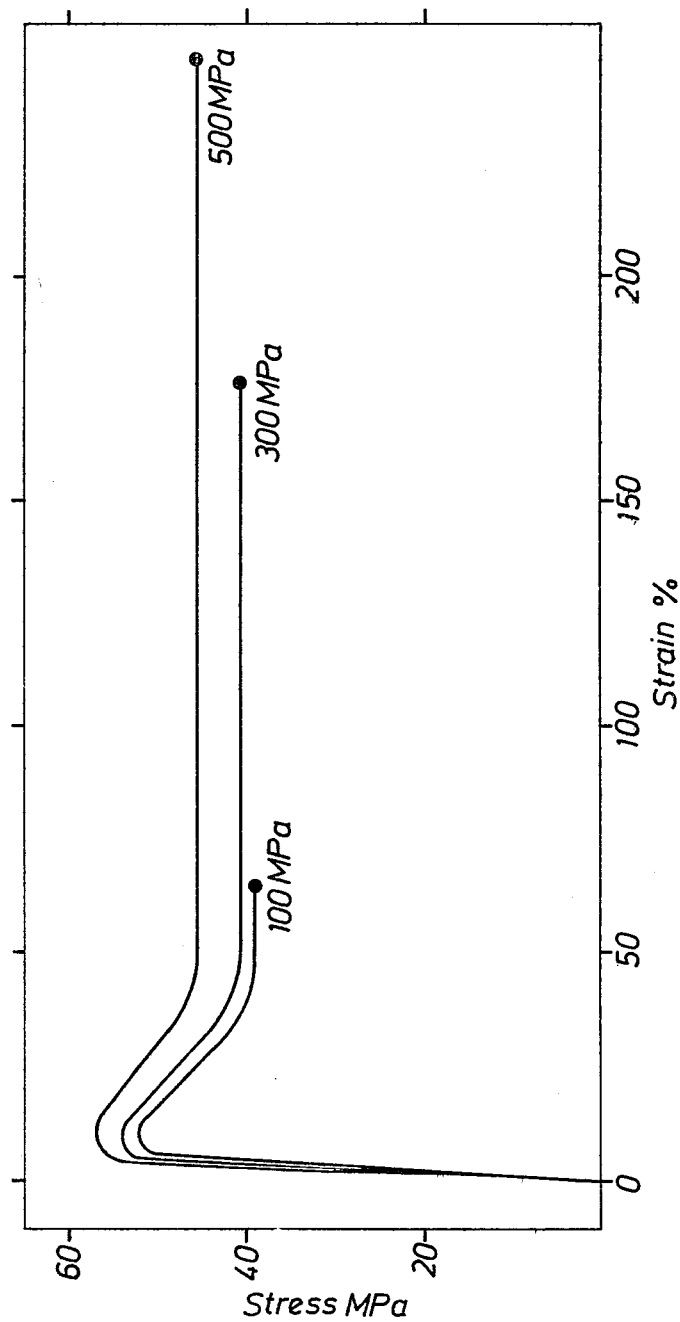
FIG. 11 shows stress-strain curves for polyacetal samples prepared at different injection pressures.
Figure 12:
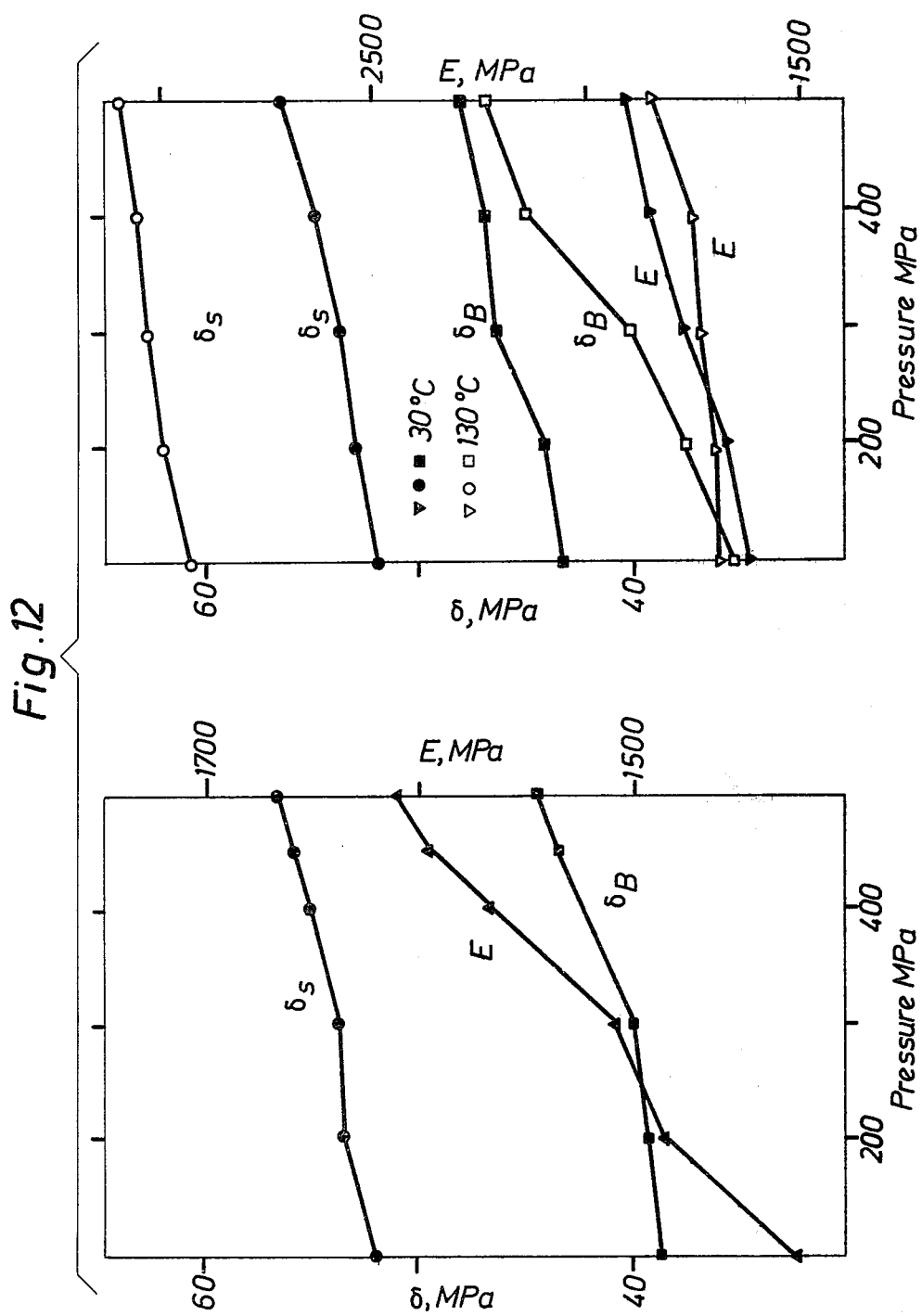
In FIG. 12, the left part shows the modulus of elasticity and the yield and breaking stresses plotted against the injection pressure for polyacetal samples, while the right part of said figure illustrates the same parameters for polyethyleneterephthalate.
Figure 13:
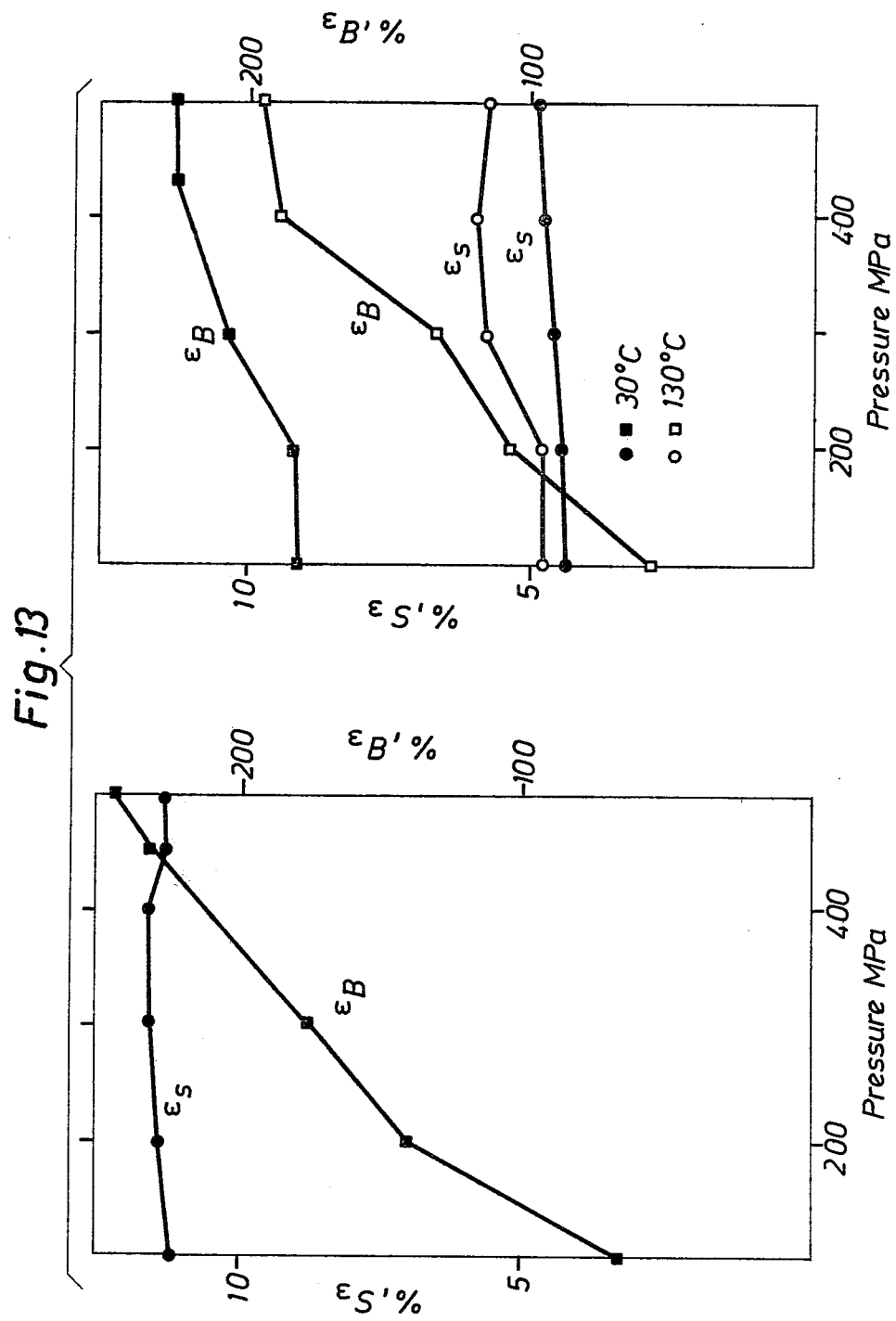
In FIG. 13, the left part shows the values for the elongation at rupture and at yield plotted against the injection pressure for polyacetal, while the right part of said figure shows the same parameters for polyethyleneterephthalate.

The essential course of the stress-strain curves for the POM-samples prepared at different pressures can be seen from FIG. 11. The values for the modulus of elasticity and for the yield and breaking stress calculated therefrom are shown in the left part of FIG. 12. According to said figure, a comparatively smaller, approximately linear increase with the pressure occurs. The results as to elongation at rupture are quite different. An increase of the pressure to 500 MPa causes a considerable increase of the elongation at rupture; cf. the left part of FIG. 13. However, the $\epsilon_S$-values are practically independent of pressure at a mold temperature of 30° C.

Figure 14:
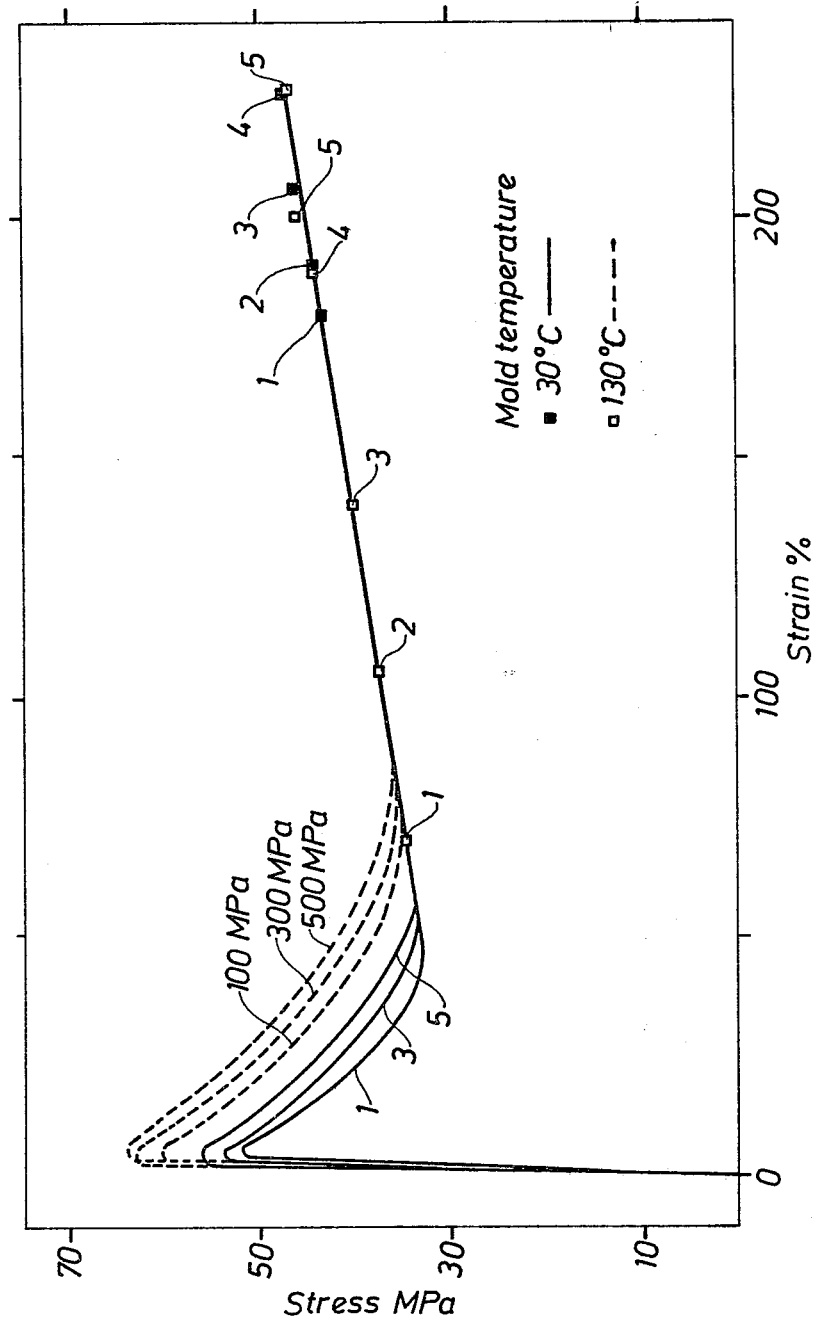
FIG. 14 shows the stress-strain curves for polyethyleneterephthalate samples at different hydraulic pressures of the injection molding machine.

The general shape of the stress-strain curves for the PETP-samples is shown in FIG. 14. The values of E, $\sigma_S$ and $\sigma_B$ calculated therefrom are shown in the right part of FIG. 12. As with the POM-samples, the variations of said parameters are comparatively small also for PETP. The mold temperature, i.e. 30° C. and 130° C., respectively, has only a slight influence. The elongation at yield remains practically unaltered. For the elongation at rupture, on the other hand, there is a considerable difference between cold (30° C.) and warm (130° C.) mold, cf. the right part of FIG. 13.

Figure 15:
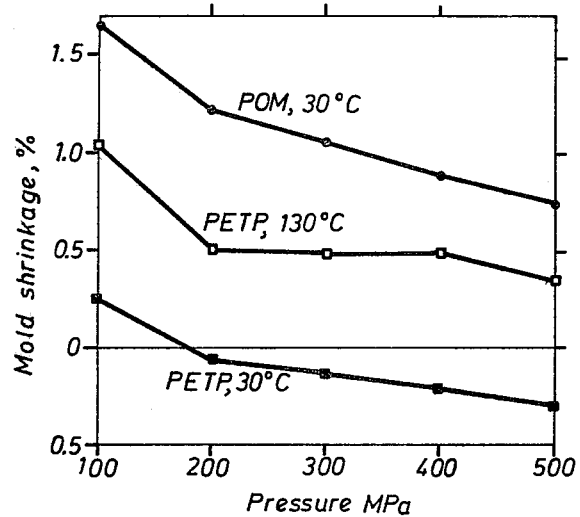
FIG. 15 shows the mold shrinkage plotted against the injection pressure for polyacetal and for polyethyleneterephthalate.

The dependence of the mold shrinkage on pressure can be seen from FIG. 15. For POM, there is a monotone decrease with increasing pressure from about 1.6 to 0.8%. (Mold temperature 30° C.)

For PETP, as expected, the shrinkage course is dependent on whether the solidification in the melt takes place in the amorphous or crystalline state, which can be affected by adjustment of the mold temperature. The difference in the pressure dependency of the shrinkage resulting therefrom is clearly shown in FIG. 15. With a cold mold (30° C.) the shrinkage decreases for the initially amorphous molding from 0.25 to −0.3% at the highest pressure value. At a mold temperature of 130° C. solidification of PETP takes place in crystalline state and the shrinkage is higher.

For the PETP-samples injection molded at a mold temperature of 30° C., an increase of the density from 1.3315 to 1.3476 g/cm$^3$, i.e. 0.016 g/cm$^3$, is observed in the used pressure range. At a mold temperature of 130° C. the density increases from 1.3589 to 1.3704 g/cm$^3$, i.e. 0.022 g/cm$^3$. The increase of the density in both cases is characterized by a plateau between 300 and 400 MPa (30° C. and between 200 and 300 MPa (130° C.), respectively.

Figure 16:
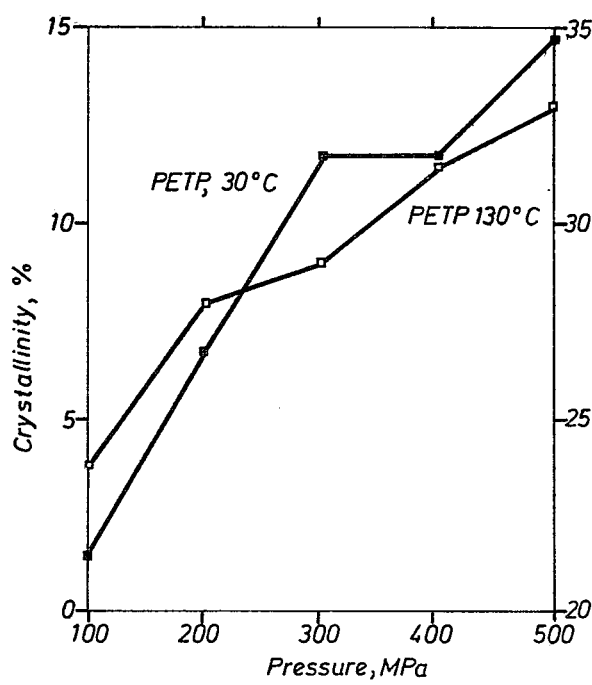
FIG. 16 shows the crystallinity plotted against the injection pressure for polyethyleneterephthalate at a mold temperature of 30° C. and 130° C., respectively.

By means of literature data for the densities of amorphous and crystalline phases, respectively, of PETP, cf. van Krevelen, D W, Properties of Polymers, Elsevier Publ. Co. 1972, page 49; Thomson, A B and Woods, D W, Nature 1967 (1955), page 78; and de P. Daubeny, R; Bunn, C B and Brown, C J, Proc. Roy. Soc. (London) Ed. A, 226 (1954), page 531, corresponding values of the crystallinity and their variation with the pressure were calculated. From FIG. 16 it can be seen that at a mold temperature of 30° C. the crystallinity increases from about 1 to 15%, while with the warm mold (130° C.) the corresponding values are 24 and 33%, respectively. For the POM-samples, mold temperature 30° C., the variation in density is only 0.001 g/cm$^3$; similarly the variations of the crystallinity were negligible.

Thus, the results obtained show that the mechanical properties, such as modulus of elasticity and yield and breaking stress as well as the elongation at yield only vary to a minor extent within the pressure range used, i.e. 100–500 MPa. On the other hand, the elongation at rupture increases considerably with the injection pressure, both when using POM and PETP. For PETP, said increase extends over the whole pressure range for the hydraulic pressure used, even if only a maximum of about 300 MPa was measured in the mold.

The increase of the elongation at rupture seems to be related with variations in the crystalline phase since it appears mainly for the POM-samples and for the PETP molded at a mold temperature of 130° C. and thus crystalline samples.

It was noted that PETP injection molded in a cold mold (20°–30° C.) at normal pressures (about 100 MPa)

was amorphous and translucent, while on increasing the pressure to 300 MPa and above the crystallinity of the same samples became fully developed.

EXAMPLES 7–10

In these experiments different polyethylene materials and polypropylene were injection molded at pressures between 100 and 500 MPa. The same injection molding machine was used as in the previous examples. The molding conditions used in preparing tensile bars and mold shrinkage plates can be seen below:

| MOLDING CONDITIONS | | | | |
|---|---|---|---|---|
| Tensile bars | Injection time (s) | Holding time (s) | Cooling time (s) | Cylinder temp. (°C.) |
| LDPE | 1 | 14 | 10 | 200–240 |
| HDPE | 10 | 5 | 8 | 200–240 |
| PP | 1 | 18 | 10 | 200–230 |
| Mold shrinkage plates | Injection time (s) | Holding time (s) | Cooling time (s) | Cylinder temp. (°C.) |
| LDPE | 1 | 14 | 30 | 180–220 |
| HDPE | 1 | 20 | 20 | 190–250 |
| PP | 1 | 20 | 20 | 200–230 |

The mold temperature was always 30° C.
The following materials were used:

| | MI (g/10 min.) | Density (g/cm³) |
|---|---|---|
| LDPE | 7 | 0.92 |
| HDPE | 7 | 0.96 |
| PP | 3 | 0.90 |

Figure 17:
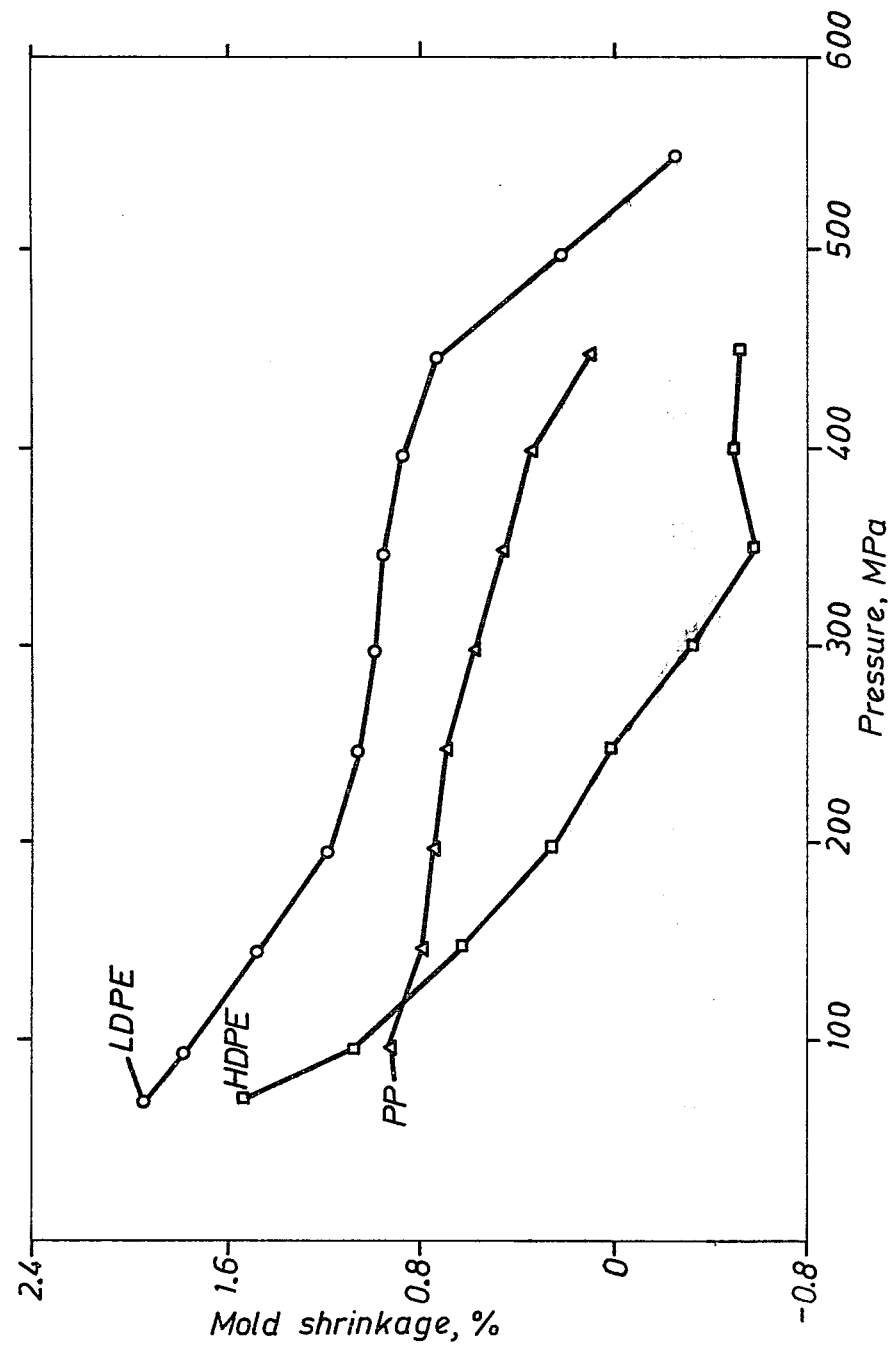
FIG. 17 shows the mold shrinkage plotted against the injection pressure for injection molded samples of low density polyethylene, high density polyethylene and polypropylene, respectively.

The variation of the mold shrinkage for LDPE, HDPE and PP can be seen from FIG. 17. For LDPE the shrinkage decreases with increasing pressure from 1.8% to −0.20%. Said decrease is especially pronounced between 100 and 200 MPa and between 400 and 500 MPa. For HDPE, the shrinkage decreases comparatively steeply to 300 MPa and then takes the form of a plateau at the highest pressure, which plateau corresponds to a negative shrinkage of about −0.5%. At about 250 MPa the shrinkage is zero.

For HDPE, a small inflexion appears in the density-pressure curve in the pressure range in which extended chain crystallization normally begins.

What we claim is:

1. In a method of injection molding a thermoplastic resin under conditions of melt temperature, mold temperature, injection time, holding time, and cooling time appropriate for said thermoplastic resin, the improvement comprising carrying out the injection molding at injection and holding pressures from 250–800 MPa, whereby the molded thermoplastic resin has reduced internal stresses and an essentially reduced tendency to mold shrinkage, warping, crazing and cracking, post-shrinkage and time-dependent deformation.

2. The method according to claim 1 wherein polyethylene having a molecular weight of 200,000 to 1,500,000 is used as the thermoplastic resin, whereby highly improved mechanical properties of the injection molded articles are obtained.

3. The method according to claim 1, characterized in that by adjusting the injection and holding pressures properly the mold shrinkage of the molded part can be reduced to zero.

4. The method according to claim 1, wherein the crystallinity of difficultly crystallizing thermoplastics is enhanced by using the high injection and holding pressures within said range.

5. The method according to claim 1 wherein the pressures are from 300–500 MPa.

6. The method according to claim 1 wherein the thermoplastic resin is selected from the group consisting of olefin plastics, styrene plastics, acrylic plastics, amide plastics, acetal plastics, carbonate plastics, polyesters, cellulose plastics and vinyl plastics.

7. The method according to claim 6 wherein the thermoplastic resin contains at least one crystalline phase and the crystallinity is changed in volume or structure by the injection and holding pressures resulting in improved mechanical strength properties of the injected molded resin.

8. The method according to claim 7 wherein the resin is selected from the group consisting of olefin plastics, amide plastics, acetal plastics, polycarbonate plastics and polyalkylene terephthalates.

* * * * *